United States Patent [19]

Serizawa

[11] Patent Number: 5,130,100
[45] Date of Patent: Jul. 14, 1992

[54] EXHAUST GAS CLEANING DEVICE

[75] Inventor: Haruo Serizawa, Shizuoka, Japan

[73] Assignee: Usui Kokusai Sangyo Kabushiki Kaisha, Japan

[21] Appl. No.: 484,561

[22] Filed: Feb. 26, 1990

[30] Foreign Application Priority Data

Feb. 27, 1989 [JP] Japan .................. 1-20319[U]

[51] Int. Cl.$^5$ .................... B01D 53/36; F01N 3/10
[52] U.S. Cl. .................... 422/180; 422/191; 422/193; 422/222; 55/385.3; 55/488; 55/489; 55/520; 55/525; 55/DIG. 30; 60/301; 60/322; 423/213.2; 423/213.5
[58] Field of Search ............... 422/180, 191, 193, 222; 55/385.3, 486, 488, 489, 520, 525, DIG. 30; 60/299, 301, 322; 423/213.2, 213.5

[56] References Cited

U.S. PATENT DOCUMENTS

| | | |
|---|---|---|
| 3,770,389 | 10/1973 | Kitzner et al. ............... 422/180 X |
| 3,798,006 | 3/1974 | Balluff ........................... 422/179 |
| 3,853,485 | 12/1974 | Hogan ........................... 422/180 X |
| 3,876,384 | 4/1975 | Santiago et al. ............. 422/179 |
| 4,186,172 | 1/1980 | Scholz ........................... 60/299 X |
| 4,220,625 | 9/1980 | Toh et al. ..................... 422/180 |
| 4,269,807 | 5/1981 | Bailey et al. ................. 422/179 |
| 4,285,909 | 8/1981 | Mizusawa et al. ............ 422/179 |

Primary Examiner—Lynn Kummert
Attorney, Agent, or Firm—Lowe, Price, LeBlanc & Becker

[57] ABSTRACT

An exhaust gas cleaning device is constructed of a honeycomb core body. The honeycomb core body has been formed by superposing a planar band made of a metal sheet and a corrugated band made from another metal sheet one over the other in a contiguous relationship and then rolling the thus-superposed bands into a multilayered spiral form. The honeycomb core body defines a number of network-patterned axial gas flow passages and is adapted to carry an exhaust gas cleaning catalyst. The honeycomb core body is divided into a central honeycomb core section of a smaller diameter and an outer honeycomb core section of a larger diameter. A separator is interposed between an outer peripheral wall of the central honeycomb core section and an inner peripheral wall of the outer honeycomb core section. The outer honeycomb core section may be divided further into plural honeycomb core sub-sections having different diameters and an additional separator may be interposed between each two adjacent core sub-sections.

10 Claims, 2 Drawing Sheets

EXHAUST GAS CLEANING DEVICE

BACKGROUND OF THE INVENTION

1. Field of the Invention

The present invention relates to an exhaust gas cleaning device constructed of a metal-made honeycomb core body for carrying and exhaust gas cleaning catalyst. As a cleaning means for exhaust gas from a motor vehicle, the exhaust gas cleaning deivce is generally installed at an intermediate point of an exhaust pipe.

More specifically, this invention is concerned with an exhaust gas cleaning device of the above sort, which is employed under severe conditions. The exhaust gas cleaning device features the use of a honeycomb core body with improved resistance to deformations and breakage by thermal expansion and stresses.

2. Description of the Related Art

Conventionally, an exhaust gas cleaning device of the above sort is constructed of a cylindrical metal casing opening in both ends thereof and a multi-layered honeycomb composite body (hereinafter called the "honeycomb core body") inserted and fixed in the metal casing. The honeycomb core body is generally fabricated by superposing a planar band made of a heat-resistant steel sheet and a corrugated band obtained by forming a similar steel sheet into a wavy or sinuous form one over the other in a contiguous relationship and then rolling the thus-superposed bands together into a multi-layered spiral form.

The honeycomb core body and metal casing are firmly joined together by brazing or soldering, so that they can withstand thermal stresses and deformations due to the high temperature of exhaust gas, exothermic reactions between exhaust gas and the catalyst and the like and further vibrations while the associated motor vehicle is running. Needless to say, the planar and corrugated bands which make up the hooneycomb core body are firmly joined together at contacts therebetween by any one of various suitable methods, for example, by welding or brazing.

There is however a recent move toward constructing an exhaust gas cleaning device without a separately-fabricated metal casing, in other words, with a metal-made honeycomb core body alone from the stand point of the price competition with conventional cordierite ceramic carriers. The omission of such a metal casing naturally leads to a reduction in the cost for inserting a metal-made honeycomb core body in the metal casing and then uniting them together, namely, in the so-called canning cost, whereby a substantial cost merit can be brought about.

However, the conventional exhaust gas cleaning devices which are each constructed of a honeycomb core body of the above-mentioned sort only or of such a honeycomb core body and a metal casing of the above-described sort cannot withstand long-term application. Especially, along the longitudinal axis of each honeycomb core, in other words, in the direction of flow of exhaust gas, deformation forces nad strains which are caused by thermal expansion and thermal stresses occurred in members (i.e., planar band and corrugated band) making up the honeycomb core body are concentrated on an area adjacent the outer peripheral wall of the honeycomb core body or an area in the vicinity of the outer peripheral wall of the honeycomb body and the inner peripheral wall of the metal casing. This tends to lead to the problems that the planar and/or corrugated bands of the honeycomb core body are subjected to considerable separation, cracking and/or breakage at the area adjacent the outer peripheral wall of the honeycomb core body and the honeycomb core body and metal casing are separated.

This has led to the need for a change to the belief that firm connection should preferably be formed between the planar band and the corrugated band, which make up the honeycomb core body, or between the outer peripheral wall of the honeycomb core body and the inner peripheral wall of the associated metal casing.

OBJECTS AND SUMMARY OF THE INVENTION

With the foregoing drawbacks of the conventional exhaust gas cleaning devices, the present inventor has conducted various investigations. As a result, it has been found extremely effective for the improvement of the durability of a honeycomb core body to divide the honeycomb core body into two or more honeycomb core sections having different diameters and then to interpose a separator, which has high heat stretchability (i.e. a high coefficient of expansion), between each two adjacent honeycomb core sections, leading to the completion of the present invention.

In one aspect of the present invention, there is thus provided an exhaust gas cleaning device constructed of a honeycomb core body. The honeycomb core body has been formed by superposing a planar band made of a metal sheet and a corrugated band made from another metal sheet one over the other in a continuous relationship and then rolling the thus-superposed bands into a multi-layered spiral form. The honeycomb core body defines a number of network-patterned axial gas flow passages and is adapted to carry an exhaust gas cleaning catalyst. The honeycomb core body is divided into a central honeycomb core sectoin of a smaller diameter and an outer honeycomb core section of a larger diameter, and a separator is interposed between an outer peripheral wall of the central honeycomb core section and an inner peripheral wall of the outer honeycomb core section. The outer honeycomb core section may be divided further into plural honeycomb core sub-sections having different diameters, and an additional separator may be interpsed between each two adjacent core sub-sections.

Owing to the above-descriibed construction, the present invention has brough about inter alia the following advantages:

i) In a metal-made exhaust gas cleaning device of the above-described sort, the concentration of thermal deformation forces on a core portion adjacent an outer peripheral wall of a honeycomb core body due to inherent substantial temperature differences between a central portion of the honeycomb core body and its outer peripheral wall can be effectively interfered by constructing the honeycomb core body in such a divided form. As long as a conventional single-piece honeycomb core body is used, it is impossible to avoid the concentration of thermal deformation forces on the outer peripheral wall of the honeycomb core body and the adjacent core portion so that separation, cracking and/or breakage of the individual members of the honeycomb core body in the outer peripheral wall and the adjacent core portion will remain as serious problems. These problems have been improved by the present invention.

ii) Owing to the above advantage i), the individual members of the exhaust gas cleaning device can be effectively protected from separation, cracking and breakage. Expensive catalyst layers coated on the surfaces of the planar and corrugated bands of the honeycomb core body are protected from separation, whereby high exhaust gas cleaning performance can be retained over a long period of time.

iii) In an exhaust gas cleaning device of the type that a honeycomb core body of such a divided construction is inserted and fixed in a metal casing, it is also possible to similarly interfere with the concentration of thermal deformation forces on the outer peripheral surface of the metal casing, contacted portions between the metal casing and the honeycomb core body, and the outer peripheral wall of the outer honeycomb core section and its adjacent core portion. Separation, cracking and/or breakage of the constituent members at such parts of the device can be prevented, whereby high exhaust gas cleaning performance can be retained over a long period of time.

BRIEF DESCRIPTION OF THE DRAWINGS

The above and other objects, features and advantages of the present invention will become apparent from the following description and the appended claims, taken in conjunction with the accompanying claims, in which:

DETAILED DESCRIPTION OF THE INVENTION AND PREFERRED EMBODIMENTS

Figure 1:
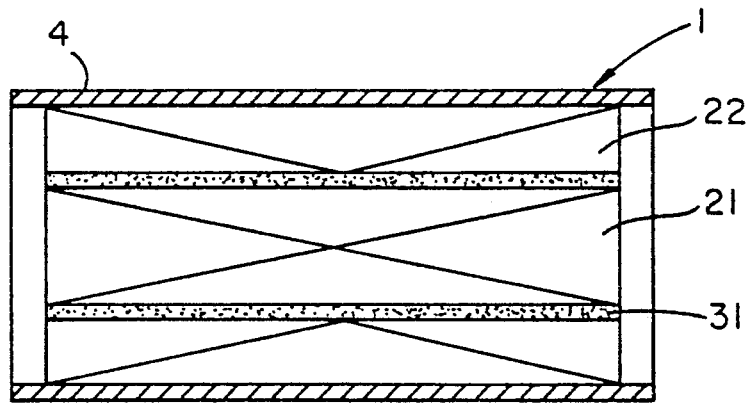
FIG. 1 is an axial cross-section of an exhaust gas cleaning device according to a first embodiment of the present invention.

In an exhaust gas cleaning device using a metal-made honeycomb core body, it is extremely important to impart sufficient durability against deformation forces which occur based on thermal expansion and thermal stresses.

In such an exhaust gas cleaning device, a central portion of a honeycomb core body is exposed to higher temperatures than a peripheral core portion because of the flow rate distribution of exhaust gas (a difference in the flow rate between the central core portion and the peripheral core portion) and catalytic reactions (exothermic reactions) of exhaust gas induced by an exhaust gas cleaning catalyst, such as Pt, Pd or Rh, carried on band surfaces of the honeycomb core body. Incidentally, the interior temperature of an exhaust gas cleaning device of this sort generally ranges from 700° C. to 800° C. but when $C_mH_n$ (hydrocarbons) are discharged at high concentrations, it becomes as high as 1,200° C. or so.

The temperature gradient inside the above-described honeycomb core body is now described in further detail. The temperature gradient in the outer peripheral wall of the honeycomb core body and a core portion a little inside the outer peripheral wall is much greater than the temperature gradient in the central core portion around the longitudinal axis of the honeycomb core body. This tendency becomes more appreciable when the outer peripheral surface of the honeycomb core body is exposed directly to the outside air or the honeycomb core body is fixedly enclosed in a cylindrical metal casing which is exposed to the outside air.

In an exhaust gas cleaning device composed of a honeycomb core body alone (i.e., of the type not using any metal casing) or an exhaust gas cleaning device composed of both a honeycomb core body and a metal casing, strong deformation forces are concentrated on a core portion adjacent the outer peripheral wall of the honeycomb core body, especially in the axial direction due to thermal expansion and thermal stresses of the constituent members of the honeycomb core body.

Even if the constituent members (planar and corrugated bands) of the honeycomb core body are firmly joined together at points of contact therebetween in the core portion adjacent the outer peripheral wall, these constituent members are susceptible to separation, cracking and/or breakage due to the above-mentioned deformation forces as the time goes on.

These separation, cracking and/or breakage of the constituent members of the honeycomb core body automatically result in the separation of expensive catalyst layers coated on the surfaces of the respective constituent members, whereby the cleaning performance for exhaust gas is reduced. This applies equally to an exhaust gas cleaning device in which a honeycomb core body is enclosed within a metal casing and the outer peripheral wall of the honeycomb core body is firmly fixed on the inner peripheral wall of the metal casing.

To solve or reduce the above-described problem of separation or the like, it is therefore indispensable to provide the honeycomb core body with a means that can reduce or relax deformation forces caused by thermal expansion or thermal stresses.

In the present invention, the metal-made honeycomb core body which is the principal element of the exhaust gas cleaning device is therefore not a single-piece honeycomb core body fabricated by rolling a planar band and a corrugated band together into a multi-layered spiral form. Instead, the honeycomb core body is divided, in other words, separated into a central honeycomb core section of a smaller diameter and an outer honeycomb core section of a larger diameter and in addition, a separator having excellent heat shrinkability is interposed between the honeycomb core sections.

Because of the structure described above, the honeycomb core body is divided into the central core section and outer core section. This facilitates axial expansion and shrinkage of the central core section which is located in a higher temperature zone of the temperature distribution and is subjected to greater loads of thermal deformation forces. Since the deformation forces of these expansion and shrinkage are absorbed by the separator, the transmission of these deformation forces to the outer core section is either reduced or prevented. Although such thermal deformation forces are concentrated on the outer peripheral wall and/or its adjacent core portion in the case of the single-piece honeycomb core body, they are effectively reduced or prevented in the divided honeycomb core body useful in the practice of the present invention.

Needless to say, in addition to the above-described division of the honeycomb core body into the two, i.e., central and outer honeycomb core sections, the outer honeycomb core section may be divided further into plural honeycomb core sub-sections in the present invention.

In the present invention, a separator is interposed between the central (i.e., inner) honeycomb core section of the smaller diameter and the outer honeycomb core section of the larger diameter, more specifically, between the outer peripheral wall of the central honeycomb core section and the inner peripheral wall of the outer honeycomb core section. These central and outer core sections and separator are integrally and fixedly joined together.

Any separator can be used as long as it has good thermal stretchability. Illustrative of the separator may include steel wool, metal meshes, perforated metal sheets having a high perforation rate, expanded metal nets, etc. Stainless steel wool and stainless meshes are preferred. These separators may be either in a planar form or in a corrugated form. To make good use of thermal stretchability of the separator, the central honeycomb core section and outer honeycomb core section can obviously be fixed together by way of portions of the separator (for example, ridge portions of a corrugated separator) when the separator is interposed between the core sections and the separator and core sections are joined together into an integral unit.

In the present invention, an exhaust gas cleaning device can be constructed only by the above-described honeycomb core body of the divided type or can be constructed by inserting the honeycomb core body of the divided type in a cylindrical metal casing and then fixing them together.

In the exhaust gas cleaning device constructed only by the honeycomb core body of the divided type, one or more ribs may be fixedly attached to at least one end of the device. When both ends are provided with one or more ribs, it is necessary to secure them in such a way that the central honeycomb core section is allowed to undergo sufficient thermal deformations. The provision of these ribs can improve the vibration resistance of the exhaust gas cleaning device and can also prevent the potential problem of separation of the central honeycomb core section due to telescoping. When a metal casing is employed, one or more ribs can similarly be applied to at least one of its end openings.

Embodiments of the present invention will hereinafter be described with reference to the accompanying drawings. It should however be borne in mind that the present invention is not limited to or by the following examples.

EXAMPLE 1

Figure 2:
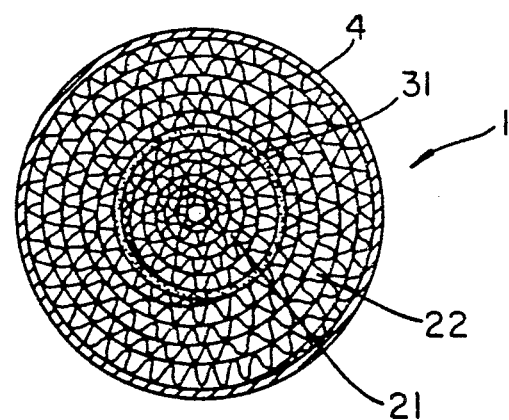
FIG. 2 is an end view of the exhaust gas cleaning device of FIG. 1, as viewed in the direction of a longitudinal central axis thereof.

An exhaust gas cleaning device 1 according to a first embodiment of the present invention is now described with reference to FIGS. 1 and 2. In the exhaust gas cleaning device 1, the honeycomb core body is divided into a central honeycomb core section 21 and an outer honeycomb core section 22. A stainless mesh 31 is interposed as a separator between the central honeycomb core section 21 and the outer honeycomb core section 22, between the outer peripheral wall of the central honeycomb core section 21 and the inner peripheral wall of the outer honeycomb core section 22. In the present embodiment, the honeycomb core sections 21,22 are both fixed to a metal casing 4.

The honeycomb core sections 21,22 can each be fabricated by superposing a planar band made of a heat-resistant steel sheet and a corrugated band made from another metal sheet of the same type one over the other in a contiguous relationship and then rolling the thus-superposed bands into a multi-layered spiral form with the outermost peripheral wall being formed of the planar band. Needless to say, the outer honeycomb core section 22 must be formed in such a way that the central honeycomb core section 21 can be centrally fitted loose in the outer honeycomb core section 22. By the rolling operation into the multi-layered form, a number of network-patterned axial gas flow passages can be automatically formed to provide flow passages for exhaust gas.

As the planar band, a heat-resistant metal sheet having a thickness of 0.03–0.1 mm, for example, a heat-resistant Fe-Cr20%-Al5% stainless steel sheet or a heat-resistant stainless steel sheet obtained by adding one or more rare earth metals to the former stainless steel to improve the oxidation resistance, said steel sheet having a thickness of 0.04 mm and a width 75 mm, can be used by way of example. As the corrugated band on the other hand, it is possible to use a similar planar band after forming it into a wavy or sinuous shape. It is preferred to use an Al-containing stainless steel for each band, because $Al_2O_3$ is formed in the form of whiskers on the surface of the band by heat treatment and these whiskers can firmly hold an exhaust gas cleaning catalyst.

As the separator, a 75 mm wide mesh obtained by forming stainless steel (SUS 304) wires (0.12 mm across) in plain weaves of 30 mesh can be used by way of example.

EXAMPLE 2

Figure 3:
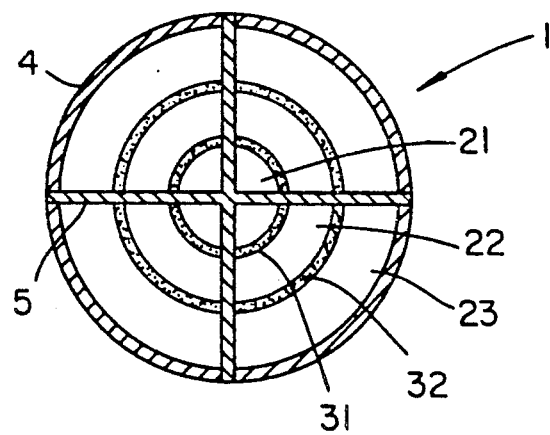
FIG. 3 is an end view of an exhaust gas cleaning device according to a second embodiment of the present invention, in which some members are omitted.
Figure 4:
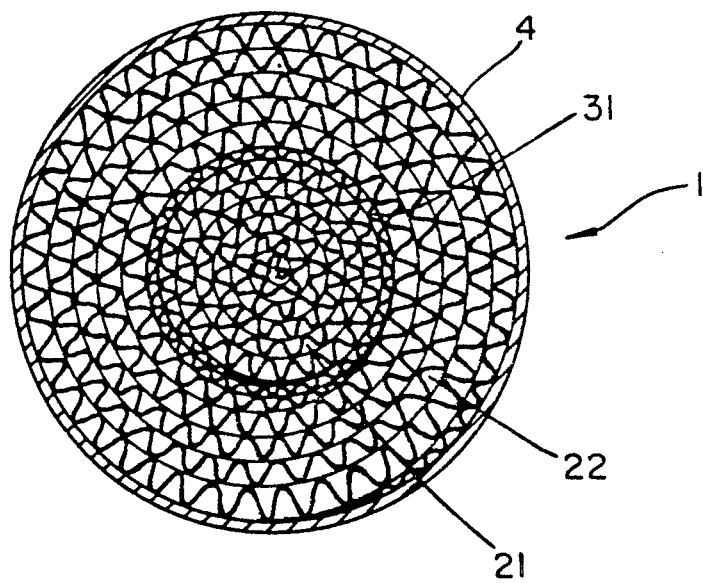
FIG. 4 is an end view of the exhaust gas cleaning device of FIG. 1, a view in the direction of a longitudinal central axis, showing the separator in a corrugated shape.

An exhaust gas cleaning device 1 according to a second embodiment of the present invention is illustrated in FIG. 3. A planar band and a corrugated band, which have been rolled together into a multi-layered spiral form, are not shown there.

The second embodiment is different from the first embodiment in that the honeycomb core body is divided into three sections 21,22,23, two separators 31,32 are hence interposed and a cruciform reinforcement rib 5 is fixed over each end opening of the metal casing 4. The separators 31,32 are each constructed of a stainless steel mesh.

I claim:

1. In an exhaust gas cleaning device constructed of a honeycomb core body, said honeycomb core body having been formed by superposing a planar band made of a metal sheet and a corrugated band made from another metal sheet one over the other in a contiguous relationship and then rolling the thus-superposed bands into a multi-layered spiral form, defining a number of network-patterned axial gas flow passages and carrying an exhaust gas cleaning catalyst, the improvement wherein the honeycomb core body is divided into a central honeycomb core section of a smaller diameter and an outer honeycomb core section of a larger diameter and a separator having a high coefficient of expansion is interposed between an outer peripheral wall of the central honeycomb core section and an inner peripheral wall of the outer honeycomb core section in order to lessen thermal deformation forces within the device.

2. The exhaust gas cleaning device of claim 1, wherein the separator is in a planar or corrugated shape.

3. The exhaust gas cleaning device of claim 1, wherein at least one rib is fixed on at least one end of the honeycomb core body.

4. The exhaust gas cleaning device of claim 1, wherein the honeycomb core body is fixedly secured in a metal casing.

5. The exhaust gas cleaning device of a claim 4, wherein at least one rib is fixed on at least one end of the metal casing.

6. In an exhaust gas cleaning device constructed of a honeycomb core body, said honeycomb core body having been formed by superposing a planar band made of a metal sheet and a corrugated band made from another metal sheet one over the other in a contiguous relationship and then rolling the thus-superposed bands into a multi-layered spiral form, defining a number of network-patterned axial gas flow passages and carrying an exhaust gas cleaning catalyst, the improvement wherein the honeycomb core body is divided into a central honeycomb core section of a smaller diameter and an outer honeycomb core section of a larger diameter and a separator selected from the group consisting of steel wool, a metal mesh, a perforated metal sheet and an expanded metal net, which is interposed between an outer peripheral wall of the central honeycomb core section and an inner peripheral wall of the outer honeycomb core section.

7. The exhaust gas cleaning device of claim 6, wherein the separator is stainless steel wool or a stainless steel mesh.

8. In an exhaust gas cleaning device constructed of a honeycomb core body, said honeycomb core body having been formed by superposing a planar band made of a metal sheet and a corrugated band made from another metal sheet one over the other in a contiguous relationship and then rolling the thus-superposed bands into a multi-layered spiral form, defining a number of network-patterned axial gas flow passages and carrying an exhaust gas cleaning catalyst, the improvement wherein the honeycomb core body is divided into a central honeycomb core section of a smaller diameter and an outer honeycomb core section of a larger diameter and a separator is interposed between an outer peripheral wall of the central honeycomb core section and an inner peripheral wall of the outer honeycomb core section wherein the outer honeycomb core section is divided further into plural honeycomb core sub-sections having different diameters and a separator is interposed between each pair of adjacent core sub-sections.

9. The exhaust gas cleaning device of claim 8, wherein the separator between the inner honeycomb core section and the outer honeycomb core section and the separator between said each two adjacent sub-sections are each selected from the group consisting of steel wool, a metal mesh, a perforated metal sheet having a high perforation rate and an expanded metal net.

10. The exhaust gas cleaning device of claim 9, wherein the separator between the inner honeycomb core section and the outer honeycomb core section and the separator between said each two adjacent sub-sections are each stainless steel wool or a stainless steel mesh.

* * * * *